United States Patent
Takahashi et al.

[11] Patent Number: 5,968,124
[45] Date of Patent: Oct. 19, 1999

[54] NETWORK OPERATION MANAGING SYSTEM, METHOD AND COMPUTER PROGRAM PRODUCT

[75] Inventors: Satoko Takahashi; Yoshihiro Oda; Shizuo Nara; Takashi Imai, all of Kawasaki, Japan

[73] Assignee: Fujitsu Limited, Kanagawa, Japan

[21] Appl. No.: 08/744,755

[22] Filed: Nov. 6, 1996

[30] Foreign Application Priority Data

May 8, 1996 [JP] Japan ................................ 8-113494

[51] Int. Cl.⁶ .................................................. G06F 15/177
[52] U.S. Cl. ................................................ 709/224; 709/223
[58] Field of Search ........................ 395/200.53, 200.54, 395/200.74, 200.31, 200.33

[56] References Cited

U.S. PATENT DOCUMENTS

| | | | |
|---|---|---|---|
| 5,101,348 | 3/1992 | Arrowood et al. | |
| 5,432,715 | 7/1995 | Shigematsu et al. | 395/182.08 |
| 5,644,706 | 7/1997 | Ruigrok et al. | 395/185.01 |
| 5,706,508 | 1/1998 | Chen et al. | 395/616 |
| 5,710,885 | 1/1998 | Bondi | 395/200.54 |
| 5,715,393 | 2/1998 | Naugle | 395/200.54 |
| 5,758,083 | 5/1998 | Singh et al. | 395/200.53 |

FOREIGN PATENT DOCUMENTS

| | | |
|---|---|---|
| 2-154555 | 6/1990 | Japan. |
| 5-75733 | 3/1993 | Japan. |
| 6-232968 | 8/1994 | Japan. |

*Primary Examiner*—Mehmet B. Geckil
*Attorney, Agent, or Firm*—Helfgott & Karas, PC

[57] ABSTRACT

Operation of a network which comprises a plurality of mutually connected subordinate-networks is performed. Operation information is unitarily managed transmitted and received in the entirety of the network. An information storing unit stores operation management information used for the network operation management. A communications unit transmits and receives the operation information. Control is performed so that when the operation information is received from a subordinate-network, updating processing is performed if the contents of the operation information should be affected in the operation management information, and, operation information for reporting is produced and distributed to needing subordinate-networks based on the operation management information if reporting processing should be performed.

11 Claims, 14 Drawing Sheets

FIG.4

| DOMAIN CLASSIFIED INFORMATION | | | | | |
|---|---|---|---|---|---|
| DOMAIN NAME | NAME | MAIL ADDRESS | EXT. NO. | FAX. NO. | BLD. INF. |
| domain1.sub.co.jp | POST1) MANAGER "A" | kanri1@domain1.sub.co.jp | 123 | 342 | A |
| domain2.sub.co.jp | POST2) MANAGER "C" | kanri3@domain2.sub.co.jp | 784 | 332 | B |
| ---- | ---- | | | | |
| A DOMAIN | POSTA) MANAGER "X" | | | | |

| NETWORK CLASSIFIED INFORMATION | | | | | |
|---|---|---|---|---|---|
| NETWORK ADDRESS | NAME | MAIL ADDRESS | EXT. NO. | FAX. NO. | BLD. INF. |
| 133.161.AAA.SSS | POST4) MANAGER "E" | kanri4@domain7.sub.co.jp | 683 | 121 | S-D |
| ---- | ---- | | | | |

221b

| NETWORK ADDRESS | ADJACENT NETWORK ADDRESS | 221c |
|---|---|---|
| 133.161.AAA.XXX | 133.161.AAA.SSS.  133.161.AAA.BBB | |
| 133.161.AAA.BBB | 133.161.AAA.DDD | |
| ⋮ | ⋮ | |

| NETWORK ADDRESS | RELATED NODE | ADDRESS | CONTACT INFORMATION | MAINTENANCE PERSON |
|---|---|---|---|---|
| 133.161.AAA.CC | ROUTER A1 | 133.161.AAA.1 | 03-3798-XXXX | PROVIDING PERSON |
| | IN UNIT (CENTER) | — | 7113-2991 | CE |
| | IN UNIT (OFFICE SIDE) | — | 7113-2991 | CE |
| | ROUTER A3 | 133.161.32.2 | 03-3798-8077 | MANAGEMENT PERSON 1 |
| | HUB | 133.161.AAA.CD | | |
| | MHLINK | 133.161.32.0 | 7113-7166 | NETWORK SERVICE MANAGEMENT PERSON |
| 133.161.AA.DD | MGS | 133.161.32.65 | | CE |
| | pea | 133.161.32.105 | 7113-2991 | PROVIDING PERSON 4 |
| | natade | 133.161.32.75 | 7113-2991 | MANAGEMENT PERSON 2 |

FIG.8

|  | A | B | C | ... | Z |
|---|---|---|---|---|---|
| A | 1 | 1 | 2 |  | 3 |
| B | 1 | 1 | 1 |  | 3 |
| C | 2 | 3 | 1 |  | 2 |
| ... |  |  |  |  |  |
| Z | 3 | 3 | 2 |  | 1 |

(Receiving side / Sending side) — 224a

SCOPE WHICH "A" DOMAIN CAN RECEIVE

FIG.9

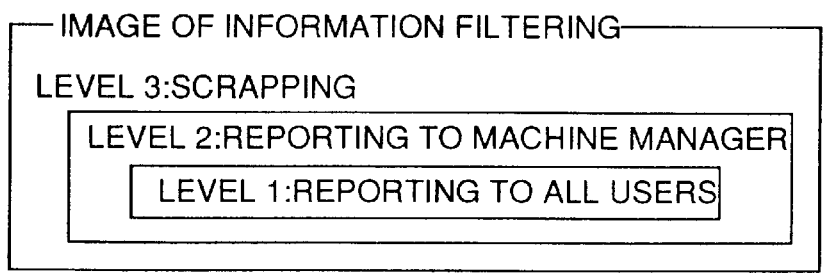

IMAGE OF INFORMATION FILTERING
- LEVEL 3: SCRAPPING
  - LEVEL 2: REPORTING TO MACHINE MANAGER
    - LEVEL 1: REPORTING TO ALL USERS

LEVEL 1: IMMEDIATELY REPORTING TO ALL USERS INSIDE OF USING DEPARTMENT
LEVEL 2: IT IS NOT NECESSARY TO REPORT TO ALL USERS INSIDE OF USING DEPARTMENT BUT IT IS NECESSARY TO REPORT TO MACHINE MANAGER OF NW.
LEVEL 3: IT IS NOT NECESSARY TO REPORT ANYBODY
LEVEL 4: ⋯

FIG.12

| SUB-NET NAME | NO RESPONSE NODE | ADJACENT NODE | TROUBLE DETERMINATION | SUPPLEMENTARY INFORMATION |
|---|---|---|---|---|
| SUB-NET NO.3 | HOST "A" | SERVER "B" | HOST "A" | |
| | SERVER "B" | SERVER "C" | | |
| | ⋮ | ⋮ | ⋮ | |
| | SERVER "Z" | ROUTER "3-2" | LAN "3" | |
| | ROUTER "Y" | ROUTER "3-1" | ROUTER "3" | ALTERNATIVE ROUTER "4" |
| TOWARD SUB-NET NO.3 PATH INFORMATION | | | | ALTERNATIVE PATH |
| SUB-NET NO.10 | ROUTER "3-1" | ROUTER "1-2" | COMMUNICATION LINE | |
| | ROUTER "1-2" | ROUTER "1-1" | ROUTER "1" | |
| | ROUTER "1-1" | SERVER "C" | ROUTER "1" | |
| | HOST "D" | SERVER "C" | HOST "D" | |
| | SERVER "C" | — | LAN "1" | |

| ACCESSING ORIGIN \ INFORMATION CLASSIFICATION | INFORMATION "1" | INFORMATION "2" | | |
|---|---|---|---|---|
| NETWORK "1" | 5C | 5C | | 3A |
| NETWORK "2" | 3B | 5B | | 2A |
| NETWORK "3" | 1A | 0A | | 2B |
| ... | | | | |
| DOMAIN "B" | 3B | 5C | | 1A |

224b

INFORMATION CLASSIFICATION

INFORMATION "1" CONDITION MONITORING SITUATION
"2" OPERATION SCHEDULE MANAGEMENT TABLE
"3" TROUBLE INFORMATION
"4" MANAGER INFORMATION

ACCESS LEVEL=DISTANCE VALUE+INFORMATION DISCLOSURE LEVEL

INFORMATION DISCLOSURE LEVEL
"A" DISCLOSING ALL INFORMATION
"B" DISCLOSING ONLY SUMMARY
"C" DISCLOSING ONLY PERIOD-DEFINED
(DEFAULT:ONE WEEK) INFORMATION
"D" DISCLOSING ONLY TO MANAGER

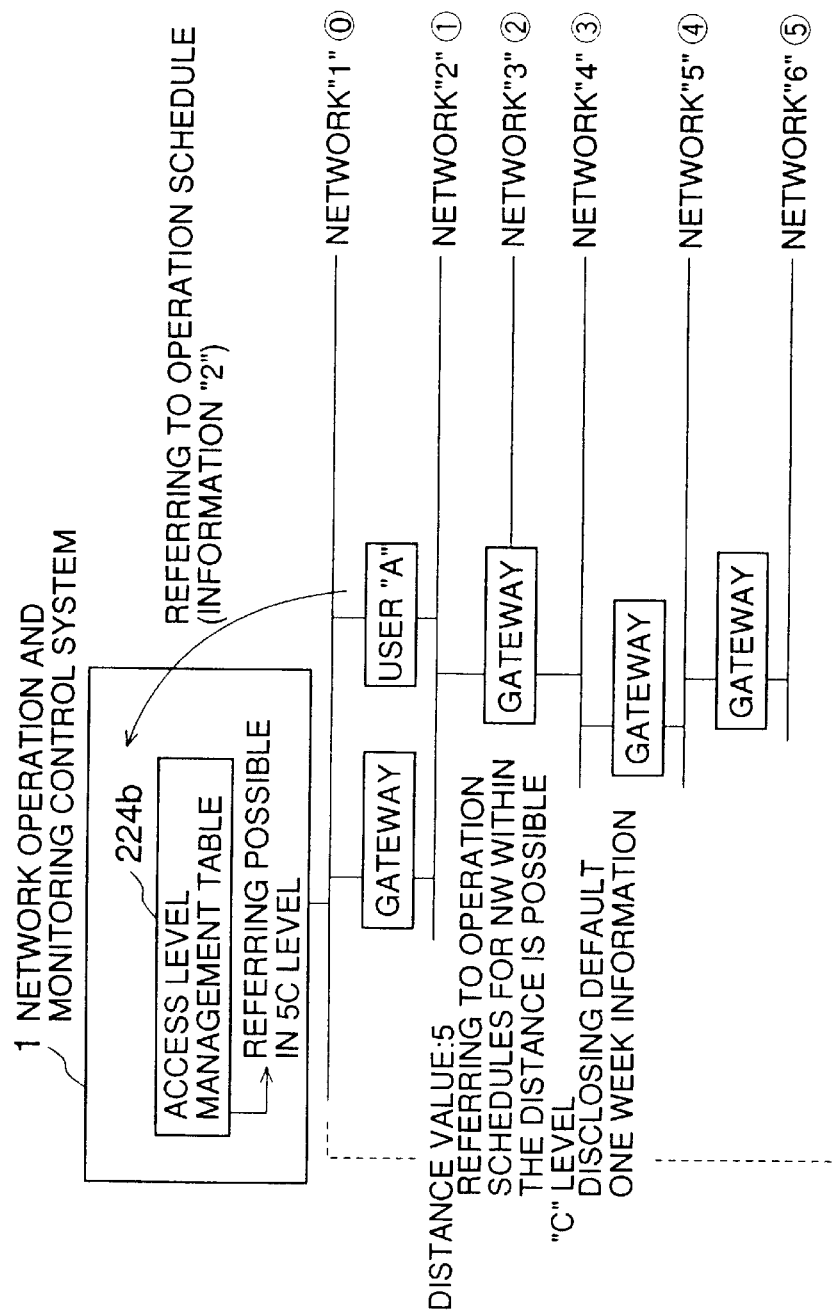

FIG.15

```
Received:  from domain by domain2 id AA12236;Thu.28 Dec 95:09:53:04 JST
Received:  by domain1id AA00790;Thu.28 Dec 95:09:47:06 JST
Return-Path:  RETURNING DESTINATION ADDRESS
Date:  SENDING DATE AND TIME
From:  SENDING PERSON'S NAME    <SENDING PERSON ADDRESS "A" DOMAIIN>     HEADER
Message-Id:  <MAIL SENDING ORIGIN MANAGEMENT NUMBER>
TO:  DESTINATION
Mime-VERSION:  1.0
Subject:  Information STOP NOTICE
Reply-To:  RETURNING DESTINATION ADDRESS
Sender:  SENDING ORIGIN ADDRESS
Errors-To:  ERROR DESTINATION "A" DOMAIN OPERATION WILL BE STOPPED FOR THE PERIOD MENTIONED BELOW    BODY
FOR YEAR END AND NEW YEAR HORIDAYS.
  WE ARE AFRAID WE WILL PUT YOU TROUBLE, AND YOUR KIND COOPERATION
WOULD BE HIGHLY APPRECIATED.

STOP PERIOD:  FROM ABOUT 15:30, DECEMBER 28,1995
                TO ABOUT 9:30, JANUARY 5,1996
```

NETWORK OPERATION MANAGING SYSTEM, METHOD AND COMPUTER PROGRAM PRODUCT

BACKGROUND OF THE INVENTION

1. Field of the Invention

The present invention relates to a system for automatically controlling transmission and reception of information concerning network operations (hereinafter, referred to as 'operation information') in a distributed processing environment in which a plurality of computers are mutually connected via a communications network.

2. Description of the Related Art

Such a distributed processing environment over a relatively wide area is configured, for example, by connecting various types of computers set in respective business offices to a LAN (Local Area Network), and, further, by mutually connecting those LANs directly or via repeating installations through a wide-area communications network. Each network manager, allocated for a respective predetermined network area, performs operation management of the network area through a respective management-use device.

When operation information of respective network areas is reported between network managers, generally, an electronic mail system is used. Then, each network manager, responding to the contents of thus-received operation information, reports necessary information to users of the respective network area. Further, by using an electronic bulletin board (news) service system, operation information which has been reported between the respective network managers can be managed unitarily, and, also, can be provided for public reading.

When a trouble or problem is detected in such a communications network through a network monitoring system or the like, the network manager who manages the network area having the trouble or problem reports this information to the other network manager and network users via an electronic mail system or the like, similar to the case where operation information is reported.

In the related art, there is no system for controlling and managing operation information through the entire communications network which is configured as a distributed processing environment. Therefore, each network manager of a respective one of network area performs a determination concerning received operation information and determines how to deal with the received operation information. However, recently the size of such a communications network has grown, and, thereby, the amount of information which network managers deal with has increased. As a result, the network load borne by each network manager has increased, and, thus, problems occur which will now be described.

In almost all cases, operation information is transmitted and received through an electronic mail system. Each network manager may receive operation information concerning a network area which has no direct relevance to a particular network manager when the particular network area is included in the area for which the electric mail system is used. Each network manager determines whether or not received operation information is operation information concerning the network area relevant to a particular network manager. Further, each network manager determines, according to the contents of received operation information, whether or not the received operation information should be reported, and, also, to which destinations the received operation information should be reported. Then, the network manager manually distributes the received operation information to appropriate users within the network area managed by the network manager. Thus, a respective network manager determines how to deal with operation information received through an electronic mail system. In other words, such determinations are left to particular network managers. Therefore, personal feelings may influence such determinations, and, thereby, oversights, mistakes, and time losses may occur. Problematic situations may occur in which impartial dealing with operation information may not be ensured, necessary operation information may not be reported to users, timely information provision may not be ensured, and so forth.

With regard to distribution of operation information, generally speaking, destinations are previously determined by a sending side, and, a receiving side only receives sent information without selection. Therefore, a receiving side cannot previously know sources from which information is distributed, and, cannot control as to whether or not reception of unnecessary information is stopped.

In a case where unitary management of operation information using an electronic bulletin board service system or the like is performed, the order of receiving of operation information is not necessarily coincident with the order of sending the operation information because required transmission time of the operation information depends on lengths of transmission lines and other various network conditions. Therefore, if the contents of the electronic bulletin board are updated according to the order of receiving of operation information, time consistency may be lost, and, thereby, inconsistency in the contents may occur. Further, when a method such as use of an electronic bulletin board in which all information is brought together into a single table is used, if a user attempts to refer to only necessary data, a considerable amount of time is required for searching that table for the necessary data, and traffic of the network is unnecessarily increased because such a user has to access unnecessary data during the search.

Further, when a problem or trouble occurs in a communications network, it is possible through a network monitoring system to determine where the problem occurs, and, then, to immediately report this location to a respective network manager. However, other actually necessary information, such as a situation analysis, a problem or trouble restoration plan, a bypass route, restarting of operation when restoration has been achieved, and so forth, is produced and distributed manually. Therefore, such actually necessary information may not be distributed timely, and, thus, it may be difficult to achieve smooth network operation.

SUMMARY OF THE INVENTION

The present invention has been developed in view of the foregoing problems, and, an object of the present invention is to improve efficiency, reliability, accuracy, and speed in network operation by unitarily managing and automatically controlling network operation information in a distributed processing environment in which a plurality of computers are mutually connected.

In the present invention, in order to solve the above described problems, a network operation managing system is provided for the purpose of operation of a network which comprises a plurality of mutually connected subordinate-networks, for unitarily managing operation information which is transmitted and received in the entire network, the system comprising:

information storing means for storing operation management information which is used for the network operation management; and communications means for transmitting and receiving the operation information;

wherein control is performed so that when the operation information is received from a subordinate-network, updating processing is performed when the contents of the operation information would be affected in the operation management information, and, operation information for reporting is produced and distributed to required subordinate-networks based on the operation management information when reporting processing is performed.

Thereby, the management of the operation information of the entire network is automatically controlled. As a result, work loads of the managers of the subordinate-networks can be considerably reduced. Further, because managers' personal subjective determination and manual operations are eliminated, the operation information is impartially and precisely handled. Further, necessary information is timely provided to respective network managers and users.

Further, it is possible that the above-described network operation managing system further comprises a problem or trouble monitoring means for monitoring problem occurring in the network;

wherein control is performed so that:

the operation management information includes problem diagnosis information used as problem diagnosis reference;

a problem is diagnosed based on the problem diagnosis information when the problem monitoring means detects the problem, the operation information for reporting information concerning the problem is produced based on a result of the diagnosis and the operation management information and is distributed to subordinate-networks which need the information, and updating processing is performed on the operation management information when a result of the problem is affected in the operation management information.

Thereby, the most recent occurrence of a network problem can be always understood. When a problem or trouble occurs, the problem occurrence position is immediately determined. Then, detour path information, resumption after problem clearing information, and so forth, which respective managers and users actually need can be rapidly reported thereto.

Further, it is possible that, in the above-described network operation managing system, the operation management information includes target extent information for defining a network extent on which the operation management is performed; and the contents of the operation management information are determined and managed wherein the network extent defined by the target extent information is treated as a target of the operation management.

Thereby, it is possible to exclude information, concerning the network extent which is not directly a target of the operation management (for example, a LAN in an office located in a distant place and connected via a wide-area communications network), from the operation management information. Thereby, it is possible to effectively reduce the amount of information storage and information processing load.

Further, it is possible that the operation management information is configured such that a plurality of information units for respective items of the network operation management are independent of each other.

Thereby, it is possible that only the information unit which is relevant to the information classification and the contents of received operation information is a target to be processed. As a result, search and updating processing can be effectively simplified, and, thus, required processing time can be shortened.

It is possible that, in the above-described network operation management system, the operation management information includes reporting scope information which defines correspondence relationship between sending origins and reporting destinations of the operation information which is transmitted and received in the network; and when reporting processing is performed for the currently received operation information, a reporting destination is determined depending on the sending origin of the operation information based on the reporting scope information, the operation information for reporting being then sent to the reporting destination.

It is possible that, in the above-described network operation management system, the reporting scope information further defines a corresponding relationship between trouble or problem occurrence positions and reporting destinations in the network; and when reporting processing concerning problem occurrence is performed, a reporting destination is determined depending on the position of the problem based on the reporting scope information, the operation information for reporting being then sent to the reporting destination.

When the operation information is distributed, distribution destinations can be automatically determined according to a predetermined distribution destination determination primary factor or factors. As a result, information can be provided impartially, in a real-time manner.

Each correspondence relationship defined by the reporting scope information can be altered in response to receiving an alteration request from a respective sending origin or a respective reporting destination.

Thereby, the reporting scope information can be controlled by two sides, the sending origin side and the reporting destination side. As a result, a reporting-destination network manager not only receives but also can stop reception of useless information and can start reception of the information which may be useful.

It is possible that, in the above-described network operation managing system, the information storing means records sending order information of the operation information which updates an information unit when the information unit of the operation management information is updated; and when updating processing is performed on the operation management information in response to received operation information, the sending order information of the received operation information is compared with the sending order information recorded for the information unit to be updated, whether or not updating of the information unit can be performed being determined based on the result of the comparison.

Thereby, time consistency of received operation information can be ensured. As a result, it is possible to prevent inconsistency from occurring in the contents of the operation information due to updating.

It is possible that, in the above-described network operation managing system, the operation management information includes access level information which defines accessing allowance levels for information classifications and information request origins; and when accessing which requests information is accepted, information disclosure is controlled according to the access allowance level defined for the information classification of the requested information and the requesting origin based on the access level information.

It is not that all the information is disclosed to the network managers and users who access the network operation managing system and thus attempt to refer to the operation management information. However, it is possible that necessary minimum information is disclosed according to the access level (representing the quantity and quality of information to be disclosed) depending on the respective accessing origins (that is, physical information such as that of network addresses, departments and so forth of the origins). Thereby, an information search can be simplified and traffic of the network can be effectively reduced. Further, flexible and fine control of information secret security protection can be achieved.

According to the present invention, in a network wherein a plurality of subordinate-networks are mutually connected, operation information of the entirety of the network is unitarily managed and automatically controlled, and, smooth network operation can be achieved without relying on a special person processing and reporting the operation information.

According to the present invention, as a result of defining a target network for which the operation information is managed, it is possible to manage the operation information and the related physical information with close relationship. Thereby, information reporting can be smoothly and effectively performed.

Further, according to the present invention, when the operation information is transmitted and received in the network, the operation information can be distributed to the user, who need the information, impartially and timely, based on a predetermined distribution destination determination primary factor or factors. It is possible that the distribution destination determination primary factors can be referred to or updated from the two sides, the sending side and the receiving side. Thereby, it is possible that information distribution is performed according to users' requests. By control, such as to stop reception of useless information, performed by the receiving side, network traffic can be effectively reduced.

According to the present invention, occurrence of inconsistency is prevented when the unitarily managed network operation management information is updated. This assures that the operation management information includes the latest and precise information, and, thus, reliability of the network operation is improved.

According to the present invention, situation reporting and problem or trouble clearing and thus response resumption reporting, which is performed by a manager's manual operations in a problem or trouble monitoring system in the related art, can be automatically performed. Thereby, rapid and smooth problem or trouble response can be achieved.

According to the present invention, by information disclosure control setting, it is possible to reduce the processing load required for information disclosure, and, also, to ensure secret security protection of the network operation management information.

Other objects and further features of the present invention will become more apparent from the following detailed description when read in conjunction with the accompanying drawings.

BRIEF DESCRIPTION OF THE DRAWINGS

FIG. 4 shows an example of a configuration of management person's post and contact information table in the various-management-table management unit shown in FIG. 2;

FIG. 6 shows an example of a configuration of a maintenance person contact list table in the various-management-table management unit shown in FIG. 2;

FIG. 8 shows an example of a configuration of a information reporting scope table in the various-management-table management unit shown in FIG. 2;

FIG. 9 shows an example of setting of information reporting levels in the information reporting scope table shown in FIG. 8;

FIG. 12 shows an example of a configuration of a trouble definition table in the relevant information management unit shown in FIG. 11;

FIG. 13 shows an example of a configuration of an access level management table in the various-management-table management unit shown in FIG. 2;

FIG. 14 shows an example of information disclosure control in the embodiment shown in FIG. 1A; and FIG. 15 shows an example of operation information via an electronic mail system.

DETAILED DESCRIPTION OF PREFERRED EMBODIMENT

With reference to the drawings, an embodiment of the present invention will now be described.

Figure 1A:
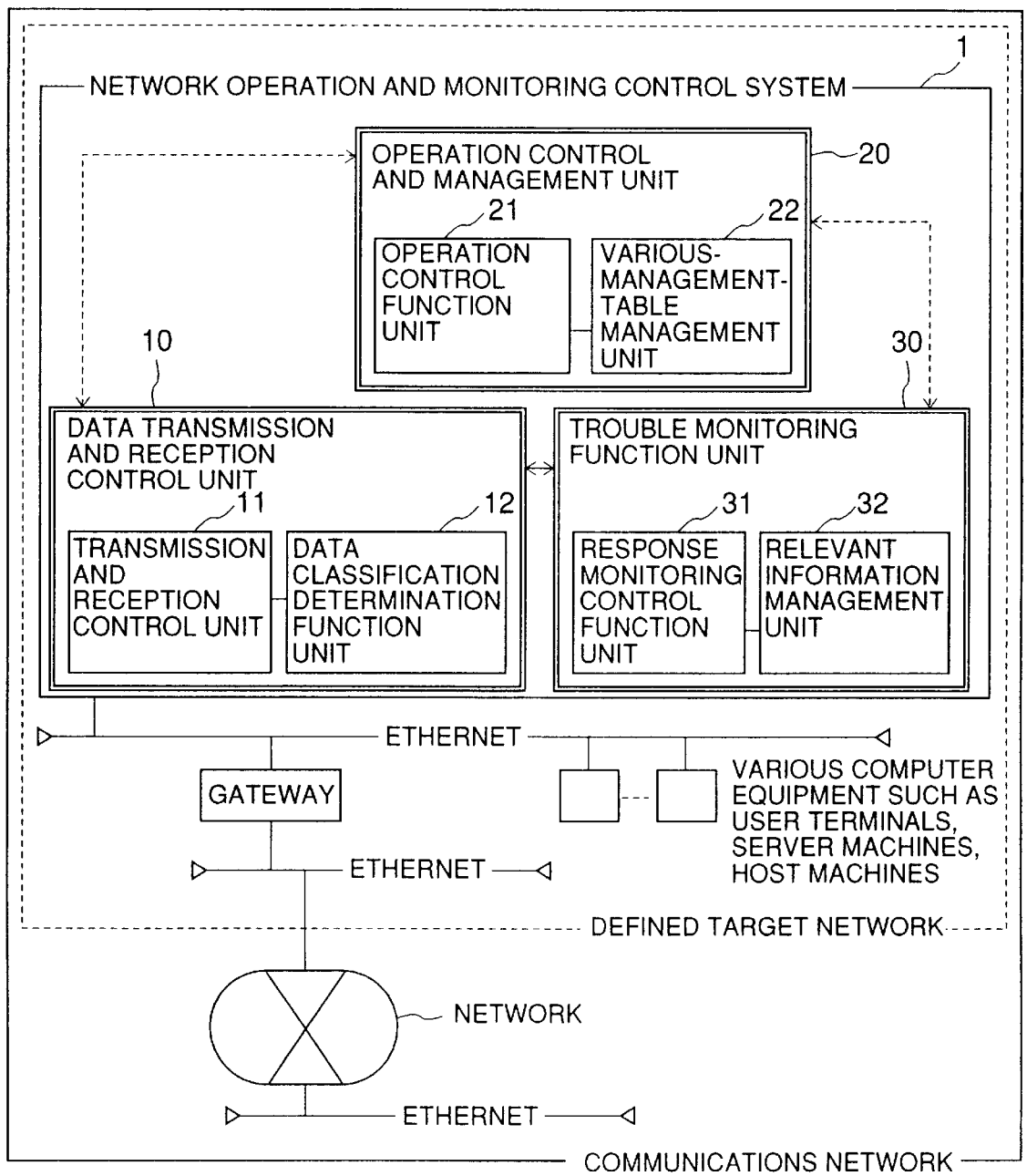
FIG. 1A shows a system configuration of one embodiment of the present invention.

FIG. 1A shows a configuration of a network operation and monitoring control system 1 in the embodiment of the present invention. A communications network in this embodiment is such as that in which a plurality of sub-networks (LANs such as Ethernets) are inter-connected directly or via gateways (installations for repeating and connecting between networks) through networks. The network operation and monitoring control system 1 can be connected to any position in this communications network as a server.

Figure 1B:
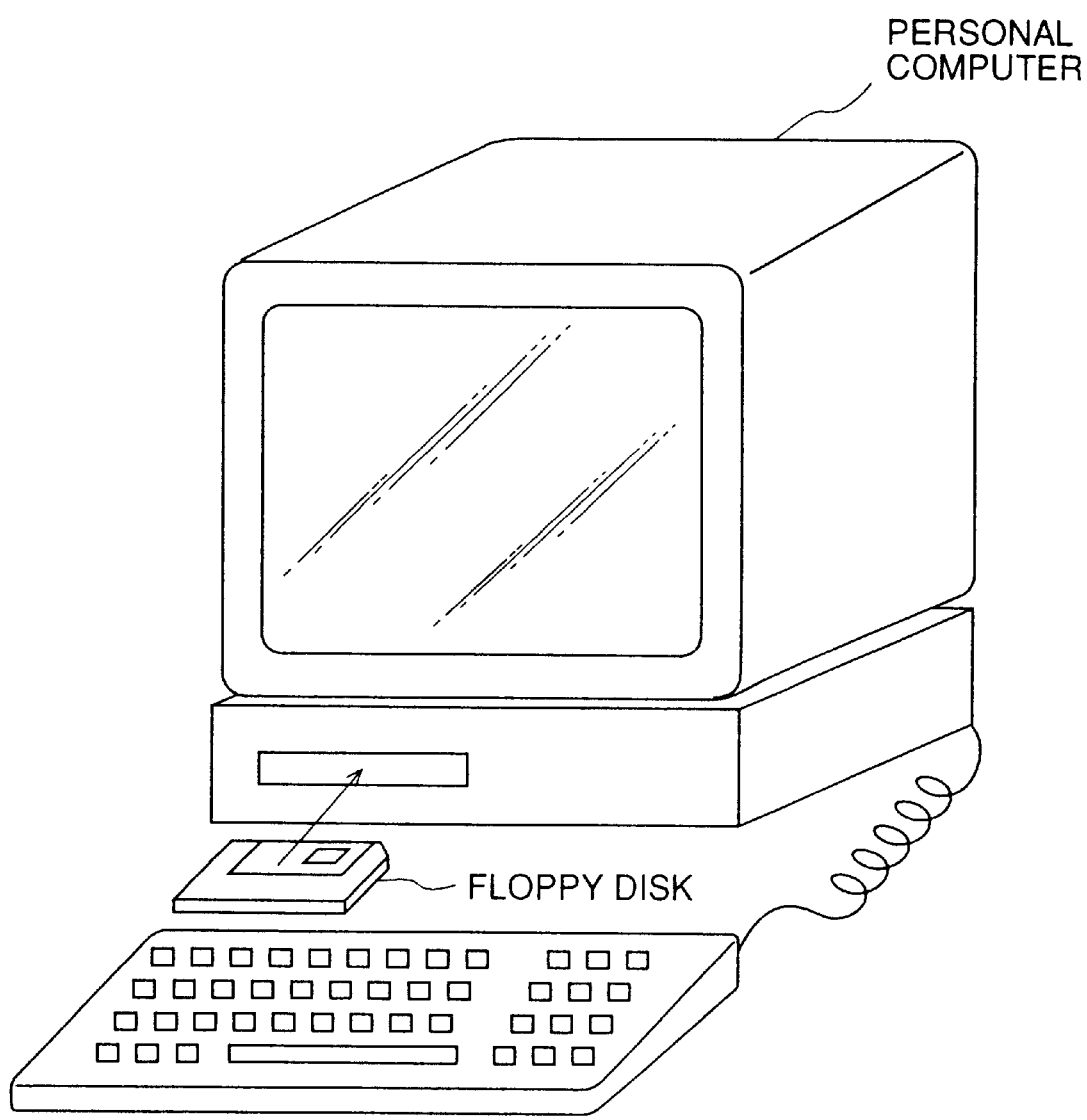
FIG. 1B shows a personal computer and a floppy disk which may be used for practicing the embodiment shown in FIG. 1A.

The network operation and monitoring control system 1, detailed configurations and functions/operations of which will be described later, may be practiced using a general-purpose computer, such as a personal computer shown in FIG. 1B, that includes appropriate information storage devices such as a hard disk drive device, a floppy disk drive device, a ROM, a RAM and/or the like, and is specially configured by predetermined software stored in a computer-usable medium such as a floppy disk shown in FIG. 1B.

The network operation and monitoring control system 1 performs control of operation management. Specifically, the system 1 receives, stores and unitarily manages operation information transmitted from respective locations of the communications network. The system 1, according to received operation information, automatically determines destinations (users, user divisions, or the like) who need this operation information, and automatically reports the operation information to these destinations. The system 1 responds to requests given by users of the communications network, and, thus, discloses necessary information to these users. Further, the system 1 performs problem or trouble monitoring control. Specifically, the system monitors so as to detect problem or trouble occurrences in the communications network. When detecting a problem, the system 1 automatically diagnoses, and, reports the problem information.

In the embodiment, an electronic mail system is used as means for transmitting operation information in the communications network. A network area (hereinafter, referred to as a 'target network'), which the network operation and monitoring control system 1 manages, is defined according to a domain name (given for a specific part of the communications network). A network manager is assigned for each domain, and manages the domain through a management-use device which is connected to the communications network.

The network operation and monitoring control system 1 includes a data transmitting and reception control unit 10 for controlling transmission and reception of operation information, an operation control and management unit 20 for controlling and managing operation information of the target network, and a problem monitoring function unit 30 for monitoring the state of the target network and controlling information handling when detecting a problem.

The data transmission and reception control unit 10 includes a transmission and reception control unit 11 for transmitting and receiving operation information and a data classification determination function unit 12 for determining the data classification of received contents. The operation control and management unit 20 includes an operation control function unit 21 for processing classification-determined data and a various-management-table management unit 22 for managing necessary information for processing operation information. The problem monitoring control function unit 30 includes a response monitoring control function unit 31 for always monitoring responses in the target network and a relevant information management unit 32 for managing information relevant to problem monitoring.

Figure 2:
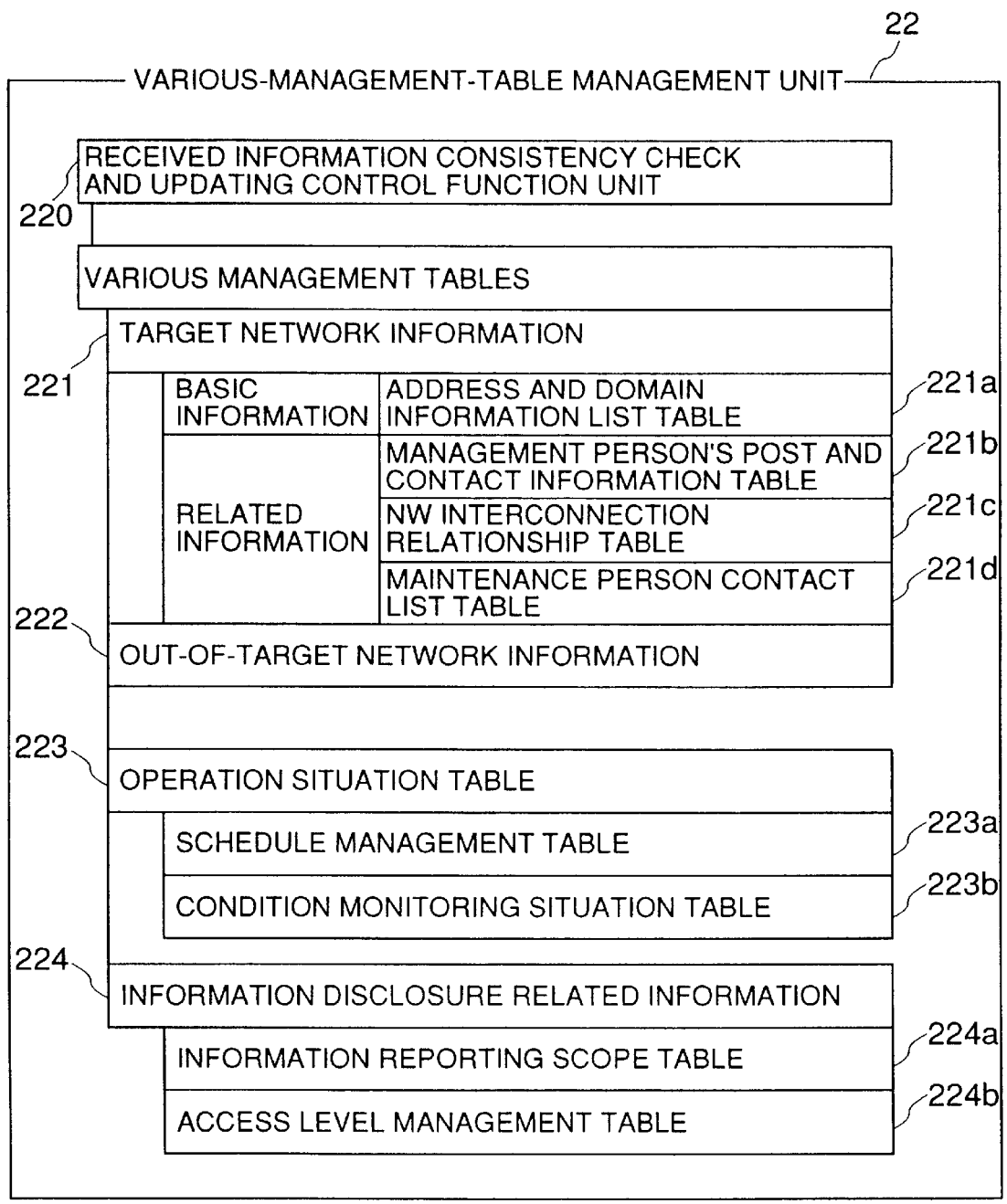
FIG. 2 shows a configuration of a various-management-table management unit of a network operation and monitoring control system shown in FIG. 1A.

FIG. 2 shows a configuration of the various-management-table management unit 22. The various-management-table management unit 22 includes a received information consistency check and updating control function unit 220, which performs control operations such as checking consistency of information when updating various management tables, and the various management tables for performing network operation management. The various management tables include a target network information 221, which is network information for the target network, out-of-target network information 222, which is network information on which operation management should not be performed, an operation situation table 223 for recording network operation situation, and information disclosure related information 224 for storing information related to information reporting and disclosure.

Defining the target network will now be described.

The system manager of the network operation and monitoring control system 1 selects items (network name, address, office, and so forth) necessary for performing operation management of the network area to be managed. Thereby, the various-management-table management unit 22 of the operation control and management unit 20 extracts information, according to the selected items, from the network information which the system has, and, thus, produces the target network information 221.

The target network information 221 is not produced as a single management table (file), but is produced as a plurality of management tables, appropriately, which include basic information and related information. In the embodiment of the present invention, as shown in FIG. 2, an address and domain information list table 221a as the basic information is produced, and, as the related information, a management person's post and contact information table 221b, a network inter-connection relationship table 221c and a maintenance person contact list table 221d are produced.

FIG. 3 to FIG. 6 show, for example, configuration of the basic information and related information of the target network information 221 in a case where the system manager previously determines to perform management of the target network using domain names.

Figure 3:
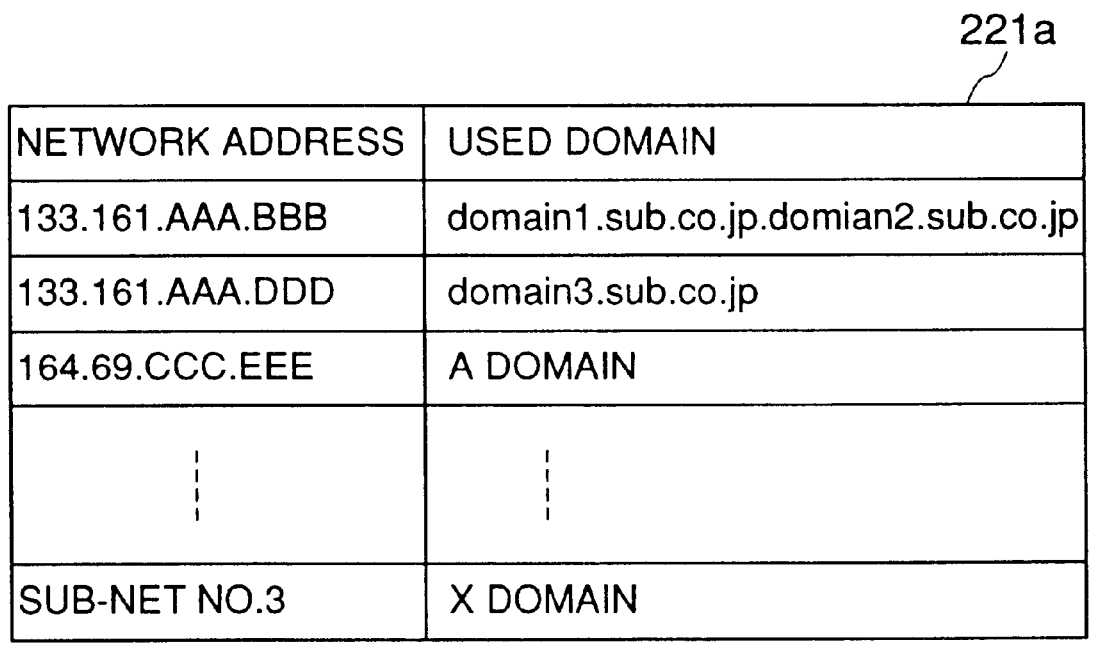
FIG. 3 shows an example of a configuration of an address and domain information list table in the various-management-table management unit shown in FIG. 2.

FIG. 3 shows an example of a configuration of the address and domain information list table 221a. The address and domain information list table is a list table indicating correspondences between addresses of sub-networks which belong to the target network and names of domains which are used in these sub-networks.

FIG. 4 shows an example of a configuration of the management person's post and contact information table 221b. The management person's post and contact information table 221b stores information of respective network managers and thus is a management table in which the name, post and contact information (mail address, extension (telephone) number (EXT. NO.), facsimile number (FAX. NO.), building information (BLD. INF.), and so forth) are registered for each manager. The management person's post and contact information table 221b is divided into domain related information and network related information. Thereby, it is possible to search the information of network managers stored in the management person's post and contact information, using domain names, and, also, it is also possible to search the information using network addresses.

Figures 5A, 5B:
FIGS. 5A and 5B show an example of a configuration of a network inter-connection relationship table in the various-management-table management unit shown in FIG. 2.

FIGS. 5A and 5B show, for example, configurations of the network inter-connection relationship table 221c. In this table 221c, information indicating connection between the address of each sub-network and the addresses of sub-networks adjacent to the first-mentioned sub-network is stored. In the example shown in FIGS. 5A and 5B, a sub-network having a network address '133. 161. AAA. XXX' has two sub-networks, adjacent thereto, having network addresses '133. 161. AAA. SSS' and '133. 161. AAA. BBB' respectively, as shown in the figures.

FIG. 6 shows, for example, a configuration of the maintenance person contact list table 221d. This table 221d is a management table in which, for each sub-network, related nodes in the sub-network, addresses thereof, maintenance persons therefor and contact information such as telephone numbers thereof are registered.

The above-described respective management tables are produced and updated, appropriately, from routing information which flows in the network, various reporting information sent by respective network managers, control information which is set in the system for information updating, and so forth.

In the system in the embodiment of the present invention, concerning the defined target network, operation information processing and trouble monitoring are controlled. Therefore, the out-of-target network information 22 is stored but is not used for the control purpose.

In the embodiment, the area of the target network is relatively narrow, and the number of management items is small. Therefore, the configurations of the respective management tables are illustrated as an image of a RDB (Relational Data Base). However, in a case where the area of the target network is wide and the amount of data to be handled is large, if such a RDB is used for this purpose, joining operations for items between the respective management tables may occur many times. Thereby, the data processing rate of the entire system may be degraded. In such a case, a known technology, OODB (Object-Oriented Data Base) may be used, and, thus, the respective management tables are managed as item (items) which is (are) necessary in network management and an operation (operations) of updating the item (items) may be treated, as a whole, as one class.

A summary of processing performed by the network operation and monitoring control system 1 will now be described.

Operation information which the network operation and monitoring control system 1 handles is classified into the following data classifications:

inquiry information for a network manager to inquire of the system regarding a network operation situation;

reporting information for mutual reporting of a network operation situation between the system and a network manager;

control information for a network manager to request the system to update and/or add operation management information; and trouble information for mutual reporting of information concerning a problem or trouble occurring in the network between the system and a network manager.

Further, operation information is transmitted and received through an electronic mail system. Item(s) described at a header of each electronic mail is previously understood between network managers so that the data classification of operation information can be determined from the item(s) described in the header of the electronic mail.

Figure 7:
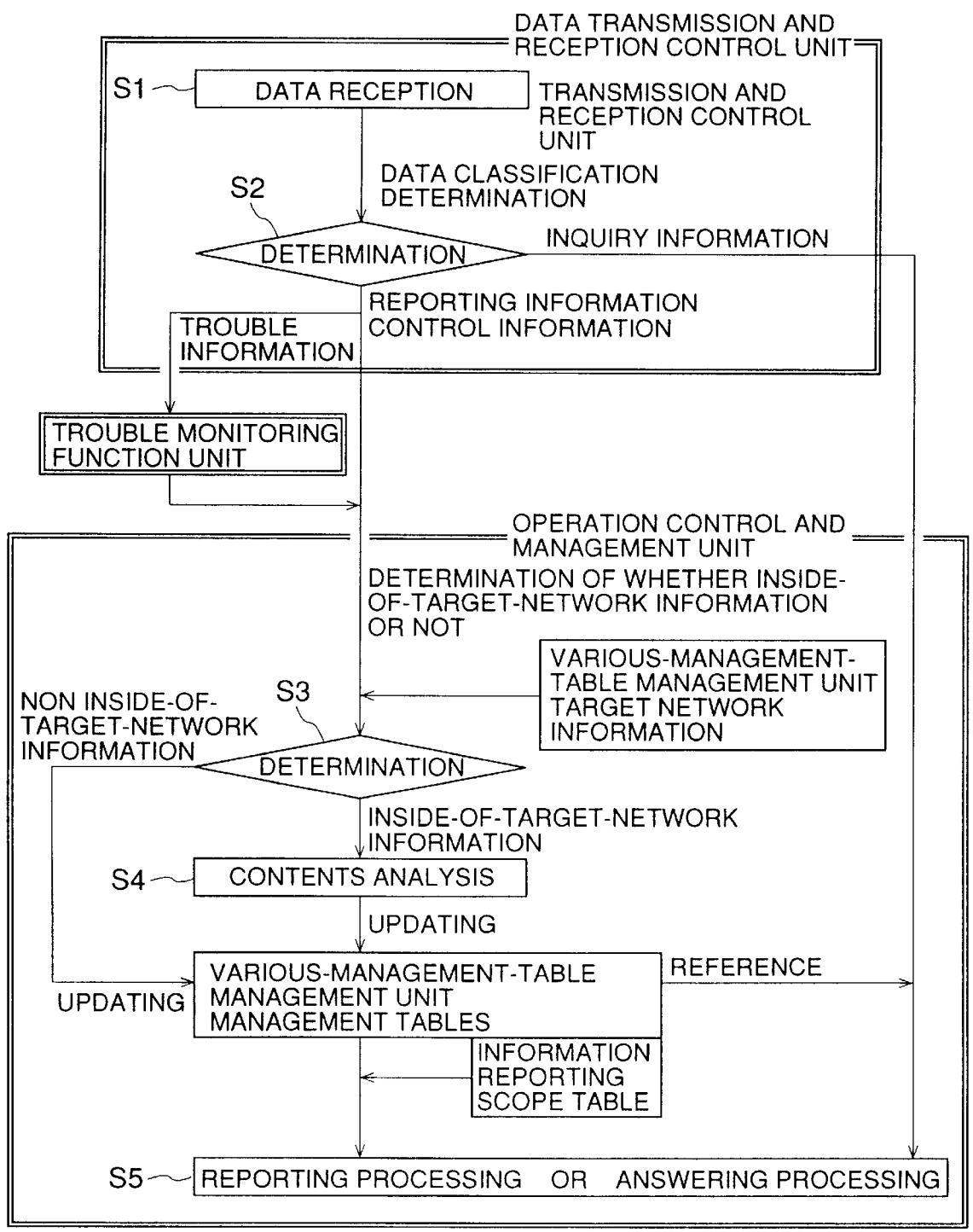
FIG. 7 shows a flowchart illustrating an operation flow of processing of received operation information in the embodiment shown in FIG. 1A.

FIG. 7 shows an operation flowchart of an automatic processing performed by the network operation and monitoring control system 1 when the system 1 receives operation information.

In the data transmission and reception control unit 10, the transmission and reception control unit 11 receives an electronic mail of operation information in step S1. The data classification determination function unit 12 determines the data classification of the operation information from the item (s) described in the header of the electronic mail in step S2. If the determined data classification is any one of the inquiry information, reporting information and control information, the operation information is sent to the operation control and management unit 20. If the determined data classification is problem or trouble information, the operation information is processed by the trouble monitoring function unit 30, and, then, is sent to the operation control and management unit 20. Processing performed by the trouble monitoring function unit 30 will be described in detail later.

If the operation information sent to the operation control and management unit 20 is inquiry information, the operation control function unit 21 extracts necessary information from the management tables of the various-management-table management unit 22. The operation control function unit 21 uses the extracted information and, thus, performs answering processing, in step S5. If the inquiry information inquires as to information which is not stored in the management tables of the various-management-table management unit 22, the operation control function unit 21 answers this situation in step S5.

In a case where the operation information is different from inquiry information, the operation control function unit 21 compares the item (s) (sending origin information) described in the header of this operation information with the contents of the target network information 221. Thereby, the operation control function unit 21 determines, in step S3, whether or nor this operation information is information inside of the target network. If the operation information is information inside of the target network, the operation control function unit 21 analyzes in further detail the contents of the operation information in use of, as key information, those items necessary for network operation (network name, domain name, date and time, stop/operation, . . . ) in step S4. Then, if necessary, updating processing is performed on management tables in the various-management-table management unit 22, and, also, reporting processing toward information distribution destinations which are determined based on the information reporting scope table 224a is performed, in step S5. If it is determined in step S3 that the operation information is not information inside of the target network, this operation information is stored as out-of-target network information 222 in the various-management-table management unit 22.

FIG. 8 shows an example of the configuration of the information reporting scope table 224a which is referred to when reporting processing is performed. In the information reporting scope table 224a, information reporting levels, which act as primary factors for determining information distribution destinations, are prescribed in matrix formation where the vertical axis represents the information sending side and the horizontal axis represents the information receiving side. When the network operation and monitoring control system 1 receives operation information from a sending side domain, the system 1 refers to the information reporting scope table 224a, and, reports the contents of the operation information to the respective domain in the receiving side according to the information reporting level which is prescribed to the sending side domain.

The information reporting levels are used to define several levels of reporting destination people inside of each receiving side domain. For example, setting of the information reporting levels can be performed as shown in FIG. 9. In this example, when the information reporting level is "1", the contents of the operation information are immediately reported to all the users in the domain. When the information reporting level is "2", the contents of the operation information are reported only to a manager of a machine. When the information reporting level is "3", the contents of the operation information are not reported to anybody.

In the example shown in FIG. 8, the operation information which was sent from the "A" domain or the operation information concerning the "A" domain is reported into all the users in each of the "A" domain and the "B" domain. Reported to the machine manager and responsible person in the "C" domain, and reported to nobody in the "Z" domain.

The network manager of each domain sends inquiry information and control information to the network operation and monitoring control system 1. Thereby, it is possible to refer to or update information concerning the domain in the information reporting scope table 224a. For example, when the manager wants to know information as to which domains information is reported to the "A" domain shown in FIG. 8 from, the manager can refer to the information defined by the broken line in FIG. 8. Further, for example, if information concerning the "C" domain is not necessary as a result of a network configuration modification or the like, the "A" domain sends control information for changing the information reporting level for the "C" domain from "2" to "3". Accordingly, it is possible to stop reception of information concerning the "C" domain.

It is possible to provide respective information reporting scope tables 224a for data classifications (for example, one for reporting information and another for trouble information). Thereby, it is possible to prescribe individual information handling systems for particular data classifications.

Figure 10:
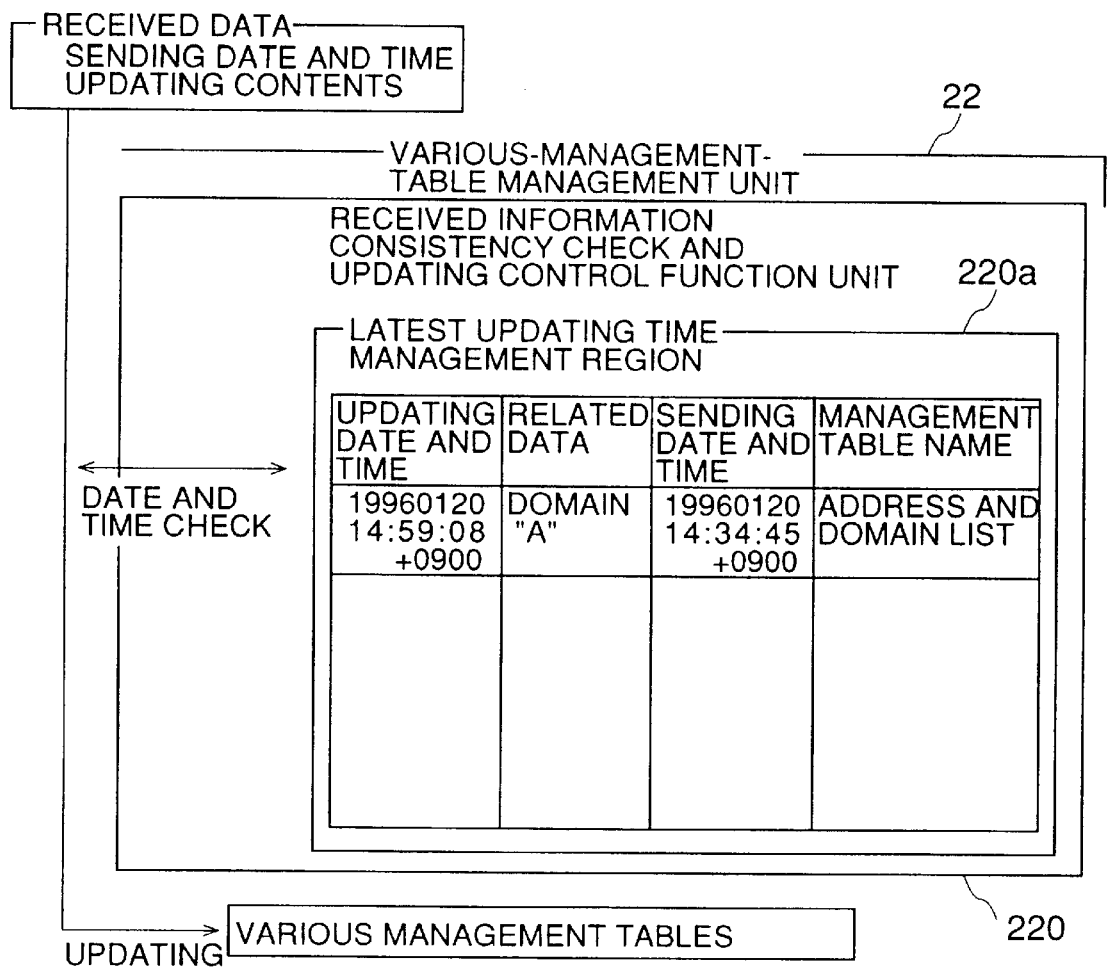
FIG. 10 shows an example of inconsistency preventing control when the various management tables are updated in the various-management-table management unit shown in FIG. 2.

With reference to FIG. 10, an example of a control routine for preventing an inconsistency from occurring when updating various management tables will now be described. The received information consistency check and updating control function unit 220 in the various-management-table management unit 22, in order to control updating of the various management tables, includes a latest updating time management region 220a. In the latest updating time management region 220a, for each management table, the latest updating date and time, sending data and time of operation information received when the latest updating was performed, and related data (the sending origin domain of the operation information received when the latest updating was performed) are recorded.

When updating of the various management tables is necessary in response to operation information received by the data transmission and reception control unit 10, the received information consistency check and updating control function unit 220 reads the sending date and time recorded in the header of the operation information. Further, the unit 220 extracts those items necessary for network management from the operation information. Then, using the extracted items as key information, the unit 220 makes a list of the management tables to be updated. Then, by referring to the latest updating time management region 220a, the unit 220 compares the sending date and time of the operation information currently received with the sending date and time of the operation information which was received when the latest updating of each of those management tables was performed. Thus, the unit 220 checks whether an inconsistency (for example, a case where the sending date and time of the operation information currently received is earlier than the sending date and time of the operation information which was received when the latest updating of each of those management tables to be updated was performed) does not appear. Further, the unit 220 checks whether an inconsistency does not appear in the contents of updating, by comparing the items extracted from the operation information currently received with the related data which is recorded in the latest updating time management region 220a. When it is confirmed there is no inconsistency in the time and also in the contents, the updating processing of those management tables is performed, and, also, the latest updating time management region 220a is updated accordingly.

In the above-described example, the latest updating time management region 220a is provided in the received information consistency check and updating control function unit 220. In so doing, information of sending dates and times of the latest updating is collectively managed. However, it is also possible that this information is managed in each management table, and the above-described checking operations are individually performed when the management table is updated.

In trouble monitoring processing will now be described.

In the trouble monitoring function unit 30, the response monitoring control function unit 31, based on the information managed in the relevant information management unit 32, always performs monitoring of responses in the target network, and, also, performs a trouble diagnosis when a problem or trouble occurs. Response monitoring processing performed by the response monitoring control function unit 31 may be practiced by means used in a pre-existing trouble monitoring system.

Figure 11:
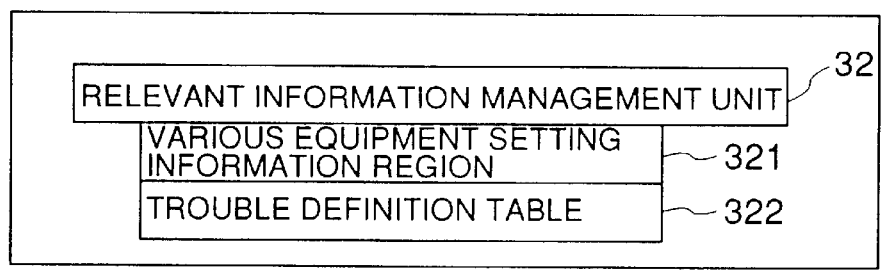
FIG. 11 shows a configuration of a relevant information management unit in a trouble monitoring function unit shown in FIG. 1A.

FIG. 11 shows a configuration of the relevant information management unit 32. A various equipment setting information region 321 is an information storage region in which setting information of response monitoring target equipment (router) is copied and managed. A trouble definition table 322 is an information storage region in which information such as equipment configurations, connection relationships, and detour paths, which are extracted from the basic information and related information of the target network information 221, is compiled and managed. The target network information 221 is updated whenever it is necessary, and, thus, stores the latest information. The trouble definition table 322 is also updated accordingly.

FIG. 12 shows an example of a configuration of the trouble definition table 322. When the response monitoring control function unit 31 detects a problem or trouble or receives trouble information from a domain having a trouble occurring therein, the trouble monitoring function unit 30 refers to the trouble definition table 322, and performs detailed problem or trouble diagnosis (determination of the position of the trouble), collects necessary reporting information such as detour path information and, produces trouble information.

For example, with reference to FIG. 12, when the response monitoring control function unit 31 detects that no response is sent from a host "A" in a sub-net No.3, the unit 31 refers to the trouble definition table 322, and examines whether or not a response from a server "B", which is a node adjacent to the host "A", has been sent. Then, if a response has been sent from the server "B", the unit 31 determines that the position of the trouble is the host "A". However, if no response has been sent from the server "B" either, the unit 31 examines whether or not a response from a server "C", which is a node adjacent to the server "B", has been sent. Thus, the unit 31 searches for the position of the trouble, using the trouble definition table 322.

After determining the position of the trouble, the response monitoring function control unit 31 performs response monitoring selectively on the node of the position of the trouble. Then, when a response from the node is resumed, the unit 31 determines that restoration has been achieved as a result of the trouble being cleared, and produces reporting information for reporting the restoration.

Trouble information and restoration reporting information produced by the trouble monitoring function unit 30 is sent to the operation control and management unit 20. Then, the operation control function unit 21 treats the received information as operation information, and performs reporting processing. The operation control and management unit 20, based on monitoring information given by the trouble monitoring function unit 30, updates the condition monitoring situation table 223b in the various-management-table management unit 22 whenever it is necessary.

Information disclosure control will now be described.

The network operation and monitoring control system 1 not only allows users to refer to information as an answer responding to inquiry information, but also allows users to directly access and refer to information which the system collects and manages. However, the system does not allow users to refer to all information according to the user's requests. The system controls information disclosure depending on information classifications and information request origins. For this purpose, in the information disclosure related information 224 of the various-management-table management unit 22, an access level management table 224a is prepared in which information disclosure control conditions are defined.

FIG. 13 shows an example of the configuration of the access level management table 224a. The access level management table 224a is formed as a matrix in which the horizontal axis represents information classifications and the vertical axis represents accessing origins. Each element of the matrix represents an access level. Each access level is a combination of a distance value of a respective accessing origin and an information disclosure level. The distance value indicates a distance between the system and the accessing origin in the network configuration as a numerical value, and is obtained from the network inter-connection relationship table 221c of the various-management-table management unit 22. The expression of the distance value is different depending on the type of network. For example, the distance value may be expressed by the number of hops or hop count (determined from the number of passing routers), the metric value, the root path cost (the distance to the root bridge determined from a bridge identifier), or the like. The information disclosure level is a value representing a level as to how wide of an extent information can be disclosed, and controls information disclosing contents, disclosing destinations and so forth.

With reference to FIGS. 13 and 14, an example of information control according to access levels when information is disclosed will now be described. When a user "A" in the same network accesses the network operation and monitoring system 1 in the network "1" for inquiring operation schedule (information "2"), the access level "5C" is obtained from the access level management table 224b shown in FIG. 13. This access level "5C" represents the distance value "5" and the information disclosure level "C". As shown in FIG. 14, the networks "1","2", "3", "4", "5" and "6" are present within the distance value "5". Thereby, the network operation and monitoring control system 1 performs information control such as to disclose the operation schedules to the user "A" for the networks "1", "2", "3", "4", "5" and "6" of the "C" level for a time period (a predetermined default time period is one week, for example).

It is possible that the access levels set in the access level management table 224b can be added and updated by use of control information given by the network manager.

A summary of processing of the network operation and monitoring control system 1 has been described. A more specific example of each processing will now be described.

An example of processing when reporting information is received will now be described.

In a case where operation information of a domain stop notice shown in FIG. 15 from the "A" domain in the target network is received by the network operation and monitoring control system 1, the transmission and reception control unit 11 in the data transmission and reception control unit 10 receives this operation information. The data classification determination function unit 12 performs data classification determination on the operation information. It is assumed that in the header of the operation information, key information such as "Information" (reporting), "Request" (inquiry) or the like is written which is predetermined depending on the data classification of the operation information. The data classification determination function unit 12 determines that this operation information is reporting information from the key information "Information" written in the header of this operation information.

In the operation control and management unit 20, the operation control function unit 21 reads the domain name of the sending origin ("A" domain) from the header of the operation information. The unit 21 refers to the address and domain information list table 221a (see FIG. 3) in the various-management-table management unit 22 and determines that the "A" domain is included in the target network. Then, the contents such as stop date and time, stop domain name, stop effective scope and so forth written in the body of the operation information are obtained as a result of the body being analyzed in detail. Accordingly, a list of the management tables to be updated is produced from among the various management tables. In this example, because the operation information is reporting about the operation situation, the schedule management table 223a should be updated.

When reporting information such as the above-described information is received, a management table to be updated is not immediately updated. The received information consistency check and updating control function unit 22 refers to the latest updating time management region 220a (see FIG. 10) and checks whether or not any inconsistency is present. In this case, the latest updating time information in the schedule management table 223a, recorded in the latest updating time management region 220a, is referenced. Thus, a check whether an inconsistency is present in the time relationship between the sending date and time of the operation information received when the latest updating was performed and the sending date and time of the currently received reporting information, and in the updating contents. If it is determined that no inconsistency is present, the schedule management table 223a is updated.

Further, the information reporting scope table 224a (see FIG. 8) in the various-management-table management unit 22 is referenced, and reporting is performed to departments (reporting destinations) that need information from the "A" domain, according the predetermined information reporting levels. In this case, according to the information reporting scope levels shown in FIG. 8, the reporting is performed to the all users of the "A" domain and the "B" domain and to the machine manager of the "C" domain. Further, no reporting is performed to the "Z" domain.

An example of processing when inquiry information is received will now be described.

Operation information from a user in the "B" domain is received by the network operation and monitoring control system 1, and, the key information "Request" was written in the header of the operation information. By this key information, it is determined that the operation information is inquiry information. Then, after detailed analysis, it is determined that the operation information inquires about the operation schedule of the "Z" domain and the request origin is the "B" domain. Based on the access level management table 224b (see FIG. 13) in the various-management-table management unit 22, the operation control function unit 21 determines that the access level for the operation schedule information (corresponding to the information "2" shown in FIG. 13), requested by the "B" domain, is "5C" according to the access levels shown in FIG. 13. As described above with reference to FIG. 14, disclosure of the information for one week in the network information within the extent of the distance value "5" from this system is allowed. If the "Z" domain is located within the extent of the distance value "5" from this system, the operation control function unit 21 extracts, from the schedule management table 223a in the various-management-table management unit 22, the operation schedule information of the "Z" domain for one week. The operation control function unit 21 performs a control so that the extracted information can be reported to the request origin, the user of the "B" domain.

If the operation situation table 223 does not have information concerning the "Z" domain recorded therein, the effect that no information is stored is answered. If access to the information of the "Z" domain is not allowed according to the access level management table, the effect that information disclosure cannot be performed is answered.

An example of trouble monitoring processing will now be described.

When the trouble monitoring function unit 30 detects, through the response monitoring control function unit 31, that no response from the router "Y" in the sub-net No.3 ("X" domain) is received, the unit 30 reports this effect as problem or trouble information to the operation control and management unit 20. In the operation control and management unit 20, the operation control function unit 21, similar to the above-described case of reporting information reception, performs various management table updating processing and trouble information reporting processing, based on the information reporting scope table 224a.

Further, when the response monitoring control function unit 31 detects that no response from the router "Y" is received, the trouble monitoring function unit 30 understands the detailed trouble situation based on the trouble definition table 322 (see FIG. 12), and performs response monitoring in a manner in which a monitoring time interval is shortened so as to perform concentrated monitoring on the router "Y". Further, the response monitoring control function unit 31 extracts the alternative router (router "4") of the router "Y" and the alternative path to the network No.3 as trouble responding information from the trouble definition table 322, and sends this information to the operation control and management unit 20. The operation control function unit 21 in the operation control and management unit 20 updates the various management tables (such as the network interconnection relationship table 221c) according to the received trouble responding information, and performs reporting processing based on the information reporting scope table 224a.

When the response monitoring control function unit 31 detects that a response from the router "Y" is resumed, the various management tables are updated accordingly, and problem or trouble clearing information such as a path alteration is reported.

It is possible that the trouble monitoring function unit 30 has an additional function for automatically altering setting information of network equipment such as a router. For example, a case will now be considered where a user wishes to alter at a predetermined altering date and time definition information of a router "M" in the network which is managed by the network operation and management control system 1. In such a case, as a result of the definition contents being previously sent as control information to the system, the definition contents are stored in the various equipment setting information region 321 in the problem or trouble monitoring function unit 30. The response monitoring control function unit 31 sets the altering date and time, and starts response monitoring. At the set altering date and time, the definition contents are read out from the various equipment setting information region 321, the read information is transmitted as control information to the router "Y". Thereby, the definition information of the router "Y" is automatically altered. Simultaneously, reporting processing for the definition alteration of the router "Y" is performed.

Further, the present invention is not limited to the above-described examples and embodiment, and variations and modifications may be made without departing from the claimed scope of the present invention.

What is claimed is:

1. A network operation managing system, for operation of a network which comprises a plurality of mutually connected subordinate-networks, said system being connected with the whole network and operation information transmitted from said whole network being unitarily managed by said system, said system comprising:

information storing means for storing operation management information used for the network operation management; and communication means for transmitting and receiving the operation information;

wherein control is performed so that when the operation information is transmitted from a subordinate-network, updating processing is performed when the contents of said operation information is determined to be reflected in said operation management information, and, operation information for reporting is produced and distributed to necessary subordinate-networks based on said operation management information when reporting processing is performed.

2. The network operation managing system according to claim 1, further comprising problem monitoring means for monitoring problem occurrence in said network;

wherein control is performed so that said operation management information includes problem diagnosis information used as problem diagnosis reference; and a problem being diagnosed based on said problem diagnosis information when said problem monitoring means detects said problem, the operation information for reporting information concerning said problem is produced based on a result of the diagnosis and said operation management information and is distributed to necessary subordinate-networks, and updating processing is performed on said operation management information when a result of said problem is affected in said operation management information.

3. The network operation managing system according to claim 1, wherein:

said operation management information includes target extent information for defining a network extent on which the operation management is performed; and contents of said operation management information are determined and managed wherein said network extent defined by said target extent information is treated as a target of the operation management.

4. The network operation managing system according to claim 1, wherein said operation management information is configured such that a plurality of information units for respective items of the network operation management are independent of each other.

5. The network operation management system according to claim 1, wherein:

said operation management information includes reporting scope information which defines a correspondence relationship between sending origins and reporting destinations of the operation information transmitted and received in said network; and when reporting processing is performed for the currently received operation information, a reporting destination is determined depending on the sending origin of said operation information based on said reporting scope information, the operation information for reporting being then transmitted to said reporting destination.

6. The network operation managing system according to claim 5, wherein;

said reporting scope information further defines a corresponding relationship between problem occurrence locations and reporting destinations in said network; and when reporting processing relating to occurrence of a problem is performed, a reporting destination is determined depending on location of said problem based on said reporting scope information, the operation information for reporting being then transmitted to said reporting destination.

7. The network operation managing system according to claim 5, wherein each correspondence relationship defined by said reporting scope information can be altered in response to a receiving an alteration request from a respective sending origin or a respective reporting destination.

8. The network operation managing system according to claim 1, wherein:

said information storing means records sending order information of the operation information which updates an information unit when said information unit of said operation management information is updated; and when updating processing is performed on said operation management information in response to received operation information, the sending order information of said received operation information is compared with the sending order information recorded for the information unit to be updated, whether updating of said information unit can be performed being determined based on a result of the comparison.

9. The network operation managing system according to claim 1, wherein:

said operation management information includes access level information which defines accessing allowance levels for information classifications and information request origins; and when accessing which request information is accepted, information disclosure is controlled according to the access allowance level defined for the information classification of the requested information and the requesting origin based on said access level information.

10. A computer-implemented network operation managing method, for operation of a network which comprises a plurality of mutually connected subordinate-networks, said system being connected with the whole network and operation information transmitted from said whole network being unitarily managed by said system, said method comprising steps of:

a) storing operation management information used for the network operation management;

b) transmitting and receiving the operation information; and c) performing a control so that when the operation information is transmitted from a subordinate-network, updating processing is performed when the contents of said operation information is determined to be reflected in said operation management information, and, operation information for reporting is produced and distributed to necessary subordinate-networks based on said operation management information when reporting processing is performed.

11. A computer program product, for operation of a network which comprises a plurality of mutually connected subordinate-networks, said system being connected with the whole network and operation information transmitted from said whole network being unitarily managed by said system, said product comprising a computer usable medium having computer readable program code means embodied in said medium, said computer readable program code means comprising:

program code means for storing operation management information used for the network operation management;

program code means for transmitting and receiving the operation information; and program code means for performing control so that when the operation information is transmitted from a subordinate-network, updating processing is performed when the contents of said operation information is determined to be reflected in said operation management information, and, operation information for reporting is produced and distributed to necessary subordinate-networks based on said operation management information when reporting processing is performed.

* * * * *